(12) United States Patent
Sevanto et al.

(10) Patent No.: US 6,848,008 B1
(45) Date of Patent: Jan. 25, 2005

(54) METHOD FOR THE TRANSMISSION OF MULTIMEDIA MESSAGES

(75) Inventors: Jarkko Sevanto, Helsinki (FI); Mohan Sivanandan, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/551,786

(22) Filed: Apr. 18, 2000

(30) Foreign Application Priority Data

Apr. 19, 1999 (FI) .................................................. 990877

(51) Int. Cl.[7] .............................................. G06F 15/16

(52) U.S. Cl. ...................... 709/249; 709/226; 709/227; 709/229; 709/238

(58) Field of Search ................................ 709/226, 227, 709/229, 238, 249, 230, 245, 225, 228

(56) References Cited

U.S. PATENT DOCUMENTS

| | | | | |
|---|---|---|---|---|
| 5,570,084 A | * | 10/1996 | Ritter et al. | ................. 370/338 |
| 5,946,629 A | * | 8/1999 | Sawyer et al. | ............... 455/466 |
| 6,044,395 A | * | 3/2000 | Costales et al. | ............ 709/206 |
| 6,178,331 B1 | * | 1/2001 | Holmes et al. | .............. 455/466 |
| 6,272,129 B1 | * | 8/2001 | Dynarski et al. | ............ 370/356 |
| 6,370,587 B1 | * | 4/2002 | Hasegawa et al. | .......... 709/245 |
| 6,473,609 B1 | * | 10/2002 | Schwartz et al. | ............ 455/406 |
| 6,487,189 B1 | * | 11/2002 | Eldridge et al. | ............ 370/338 |

FOREIGN PATENT DOCUMENTS

| | | |
|---|---|---|
| WO | WO 97/20442 | 6/1997 |
| WO | WO 98/19438 | 5/1998 |
| WO | WO 98/58476 | 12/1998 |

OTHER PUBLICATIONS

"HP Openmail Short Message Servie (SMS) Gateway: The Mobile Phone As An E–Mail Client–Of–Choice", S. Smale, International Workshop on Mobile Multi–Media Communications, 1995, pp. 1–6.

"Nomadic Access To Information Services By A GSM Phone", Kylanpaa et al., Computers and Graphics, 1996, pp. 651–658.

"Conception Of A Multimedia Electronic Mail Based On Standards". Gay et al., Distributed Computing Systems, 1993, pp. 16–22.

* cited by examiner

Primary Examiner—Saleh Najjar
(74) Attorney, Agent, or Firm—Perman & Green, LLP (57) ABSTRACT

The invention relates to a method for the transmission of multimedia messages in a communication system from a transmitting terminal (MS1) to a receiving terminal (RH, MS2). The communication system comprises at least a first communication network (NW1), a second communication network (NW2) and a multimedia message switching centre (MMSC). In the first communication network (NW1), at least a first address type is used as the terminal address, and in the second communication network (NW2), at least a second address type is used as the terminal address. In the method, the address of the receiving terminal (RH, MS2) is annexed to said multimedia message. The multimedia message is further supplemented with data on the type of said address, wherein the multimedia message is transmitted from the transmitting terminal (MS1) to said multimedia message switching centre (MMSC), in which the type of the address of the receiving terminal (RH, MS2) is examined, and said address type is used to select the communication network (NW1, NW2) to be used in the transmission of the message from the multimedia message switching centre (MMSC) to the receiving terminal (RH, MS2).

20 Claims, 5 Drawing Sheets

METHOD FOR THE TRANSMISSION OF MULTIMEDIA MESSAGES

BACKGROUND OF THE INVENTION

The present invention relates to a method for the transmission of multimedia messages according to the preamble of the appended claim 1, a communication system according to the preamble of the appended claim 11, a multimedia terminal according to the preamble of the appended claim 18, as well as a communication system according to the preamble of the appended claim 19.

By means of a multimedia messaging service MMS, the user of a wireless communication device, such as a wireless terminal, can transmit multimedia messages to a receiving wireless communication device or terminal connected to the Internet data network. Such a multimedia message may contain various information, such as text, images, video information, sound, etc. When the user of a wireless communication terminal prepares a multimedia message for transmission, the user selects the target address as well as the content of the message. For transmitting e.g. a text-based e-mail message, an e-mail application is started in the wireless communication device, to give the receiver's e-mail address, to write the message in text format, and possibly to select one or more attachment files to be transmitted. After giving the transmit command, the program starts the transmission of the message by setting up a connection to a message switching centre or the like arranged in the mobile communication network. For this purpose, the number of this message service centre is advantageously stored in advance in the wireless communication device, wherein the user does not need to give this number separately for each e-mail transmission. After setting up of the connection, the e-mail is transmitted in a way known as such to the messaging centre, in which the connection data of the receiver of the message are examined. After this, the messaging centre tries to transmit the message to the receiver on the basis of these connection data.

In systems of prior art, the connection data of the receiver must be given in a certain format which depends on the type of the message transmission system. For example, when short messages are transmitted in the GSM mobile communication system, the receiver's connection data given is the receiver's mobile telephone number MSISDN (Mobile Station integrated International Service Digital Network), for example +358 40 123 4567. Correspondingly, in the Internet data network the address is typically in the format firstname.lastname@department.firm.com. This Internet address is transmitted in the Internet data network to a so-called domain name server DNS, which finds out the numerical address data of the domain on the basis of the domain part (department.firm.com) of this IP address. After this, the message is transmitted to this domain address, in which the domain server or the like finds out the correct target address within the domain, in this example by using the firstname.lastname part in front of the @ character, which is known as such.

The term "wireless communication system" refers generally to any communication system which enables a wireless data transmission connection between a wireless communication device (MS, Mobile Station) and the stationary parts in the system when the user of the wireless communication device moves within the service area of the system. A typical wireless communication system is a public land mobile network PLMN, such as the Global System for Mobile telecommunications GSM.

The term "Internet" is used generally to describe an information resource from which data can be retrieved with a data processing device, such as a personal computer (PC). The data processing device is in a data transmission connection via a modem to a telecommunication network. This information resource is distributed world-wide, cornprising several storage locations which are also in a data transmission connection to the telecommunication network. The Internet is made functional by defining certain data traffic standards and protocols, such as TCP (Transfer Control Protocol), UDP (User Datagram Protocol), IP (Internet Protocol), and RTP (Real time Transport Protocol), which are used to control data transmission between the large number of parts in the Internet data network. The TCP and UDP are involved in preventing and correcting data transmission errors in information to be transmitted in the Internet network, the IP processes the structure and routing of information, and the RTP is designed for real-time data transmission in the Internet data network. The Internet protocol versions presently in use are IPv4 and IPv6.

By using a wireless communication device, it is also possible to set up a connection to the Internet data network e.g. in such a way that a computer is connected to the wireless communication device which is thus used as a radio modem. The way of coupling to the mobile cornmunication network is thus a so-called circuit-switched connection. For such a circuit-switched connection, resources are allocated all the time, irrespective of whether there is anything to transmit.

Figure 1:
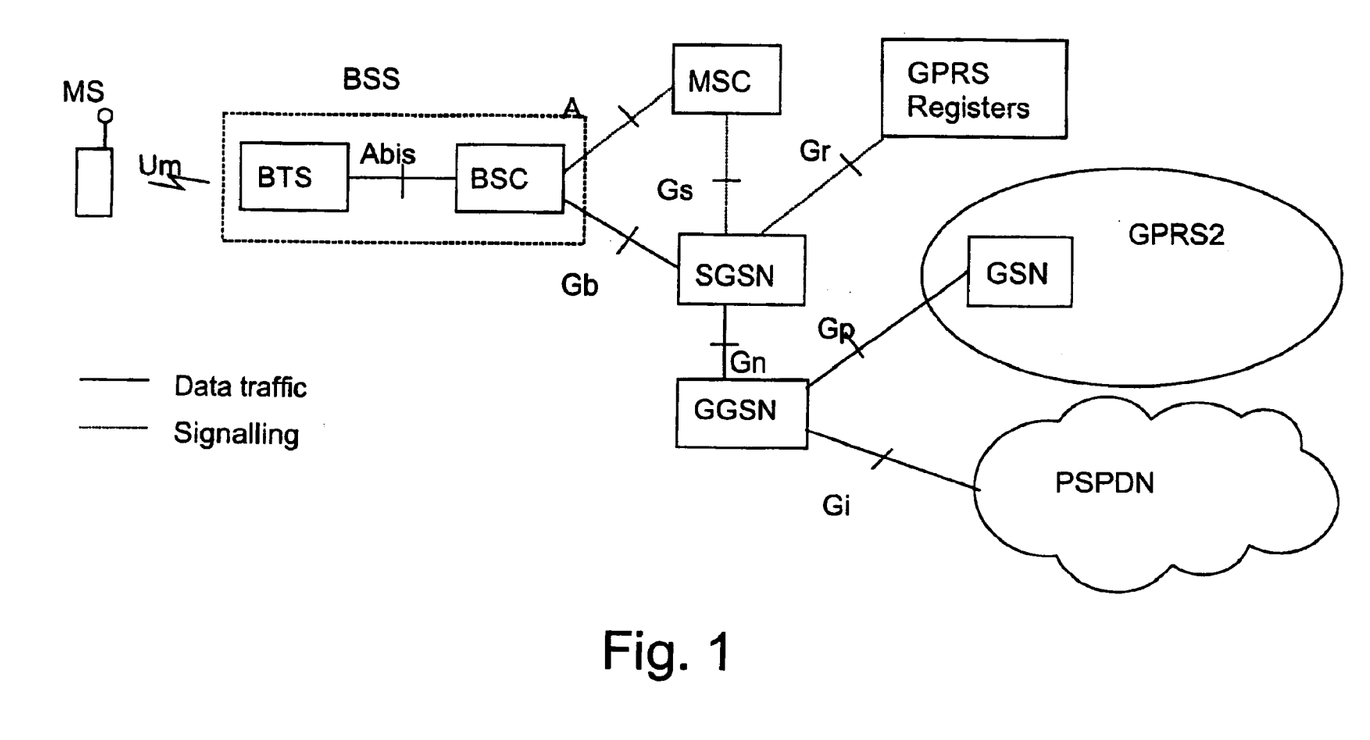
FIG. 1 is a reduced chart showing a GPRS system.

The general packet radio service GPRS is a new service under development in the GSM mobile communication system. The appended FIG. 1 shows connections of a telecommunication network in a packetswitched GPRS service. The main element in the network infrastructure is a GPRS support node, so-called GSN. It is a mobility router for implementing the coupling and cooperation between different data networks, e.g. to a public switched packet data network PSPDN via a connection Gi or to the GPRS network of another operation via a connection Gp, mobility management with GPRS registers via a connection Gr, and the transmission of data packets to wireless communication devices MS irrespective of their location. Physically, the GPRS support node GSN can be integrated in a mobile switching centre MSC, or it can be a separate network element based on the architecture of the data network routers. User data is passed directly between the support node GSN and the base station subsystem BSS consisting of base transceiver stations BTS and base station controllers BSC, but there is a signalling connection Gs between the support node GSM and the mobile services switching centre MSC. In FIG. 1, continuous lines between blocks illustrate data transmission (i.e. the transmission of speech and/or data in digital format), and broken lines illustrate signalling.

Physically, the data can be transmitted transparently via the mobile switching centre MSC.

The radio interface between the wireless communication device MS and the landline network is conveyed via the base transceiver station BTS and is indicated with the reference Um. The references Abis and A, respectively, describe the interface between the base transceiver station BTS and the base station controller BSC and between the base station controller BSC and the mobile switching centre MSC, which is a signalling connection. The reference Gn describes a connection between different support nodes of the same operator. The support nodes are normally divided into gateway support nodes GGSN (Gateway GSN) and serving support nodes SGSN (Serving GSN), as shown in FIG. 1.

Consequently, the GPRS service makes it possible to transmit packetformat information between a wireless communication device and an external data network, wherein certain parts of the mobile communication network constitute an access network.

Figure 2:
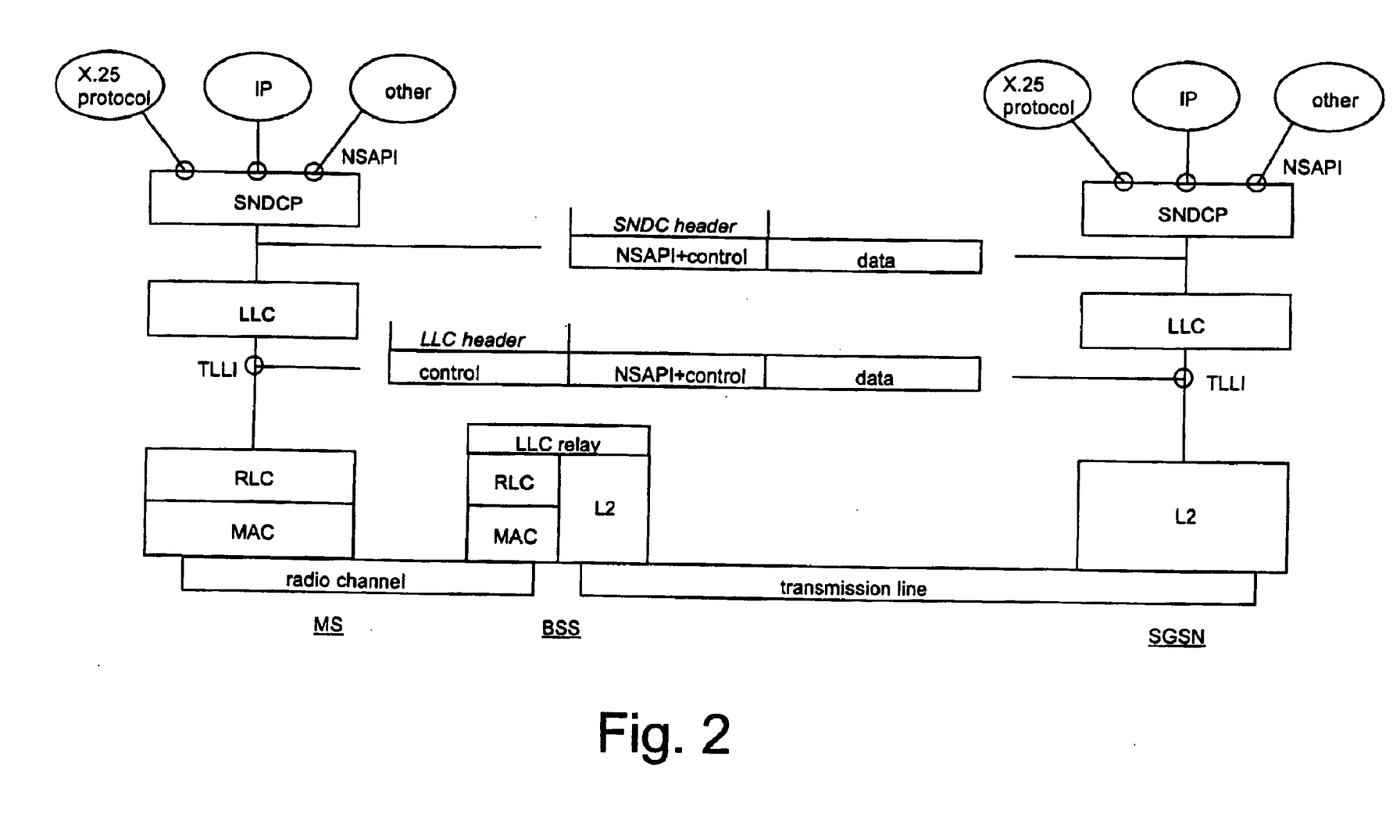
FIG. 2 is a reduced view on the protocol stack structure in the GPRS system.

The operation of the wireless communication device MS and the support node SGSN can be divided into different layers, each of them having a different purpose, as shown in FIG. 2. Information to be transmitted between the wireless communication device MS and the support node SGSN, for example control signalling and information transmitted by the user, is transmitted preferably in the form of data frames. The data frame of each layer consists of a header field and a data field.

The information contained in a data field can be e.g. information entered by the user of a wireless communication device, or signalling data. The following is a description of the functional tasks of the layers in the GPRS system.

In the data link layer, the lowermost layer is the MAC layer (Media Access Control) which takes care of the use of the radio channel in traffic between the wireless communication device MS and the base station subsystem BSS, such as the allocation of channels for the transmission and reception of packets.

At the lowermost level, data transmission between the base station subsystem BSS and the support node SGSN takes place in the L2 layer (data link layer) using a link layer protocol, such as the LAPD protocol, the frame relay protocol, or the like. The L2 layer may also contain quality or routing data according to the GPRS specifications.

The L2 layer has properties of the physical layer and the data link layer according to the OSI model.

Above the MAC layer, there is the RLC layer (Radio Link Control), which serves the purpose of dividing the data frames generated by the LLC layer into packets of a determined length to be transmitted on the radio channel (PDU, Protocol Data Unit), transmitting the packets, and retransmitting, if necessary. In the GPRS system, the length of the packets is the length of one GSM time slot (ca. 0.577 ms).

The LLC layer (Logical Link Control) offers a reliable communication link between the wireless communication device MS and the support node SGSN. For example, the LLC layer supplements the message to be transmitted with error correction data, whereby it is possible to try to correct incorrectly received messages and retransmit the message, if necessary. Furthermore, data encryption and decryption takes place in the LLC layer.

In the SNDCP layer (Sub-Network Dependent Convergence Protocol), protocol changes, compressing and segmenting of information to be transmitted, as well as the segmenting of messages coming from an upper layer, take place. An SNDCP frame advantageously comprises an SNDCP header and an SNDCP data field. The SNDCP header consists of protocol data (Network Service Access Point Identity, NSAPI) and SNDCP control data, such as compressing, segmenting and encryption specifications. The SNDCP layer is used as a protocol adapter between protocols used at an upper layer (IP/X.25) and the protocol of the LLC layer (data link layer).

The information to be transmitted preferably comes from an application to the SNDCP layer in the form of data packets according to a protocol (PDP, Packet Data Protocol), such as in messages according to the X.25 protocol or in packets according to the Internet protocol (IP). The application can be e.g. a data application of the wireless communication device, a telecopy application, a computer program in a data transmission connection with the wireless communication device, etc.

The SNDCP frame is transferred to the LLC layer, in which the frame is supplemented with an LLC header. The LLC header comprises e.g. an LLC control element which defines the frame number and command type (info, acknowledgement, retransmission request, etc.). In connection with accessing the GPRS packet network, the wireless communication device transmits a log-in request message to the support node SGSN. On the basis of the device identification of the wireless communication device (IMSI, International Mobile Station Identity), the support node SGSN can retrieve information from the home register HLR corresponding to the wireless communication device in question, wherein the support node SGSN can, using this information, select a temporary logical link identity (TLLI) for the data transmission connection.

If the wireless communication device has previously had a TLLI identity in its use, the wireless communication device transmits it in the request message, wherein the support node SGSN can give this identity to the use of the wireless communication device again, or reserve a new TLLI identity. The support node SGSN transmits the TLLR identity of its selection to the wireless communication device, to be used in the data transmission connection between the wireless communication device and the support node SGSN. This TLLI identity is used in the communication to determine, which data transmission connection each message belongs to. The same TLLI identity must not be used in more than one data transmission connection at the same time. After the end of the connection, the TLLI identity used in the connection can be given to a new connection to be set up.

Cells in a packet network are divided into routing areas in such a way that each routing area comprises several cells. Thus, the mobility management functions of the wireless communication device are used to maintain information about the location and connection state of wireless communication devices in the service area of the packet network. This information is maintained both in the wireless communication device and in the packet network, preferably in the GPRS support node SGSN.

To use GPRS services, the wireless communication device first performs a log-in in the network (GPRS attach), whereby the wireless communication network reports that it is ready for packet data transmission.

The GPRS attach sets up a logical link between the wireless communication device and the support node SGSN, enabling the transmission of short messages (SMS, Short Message Services) via the GPRS network, paging services via the support node, and informing about incoming packet data to the wireless communication device.

In connection with the GPRS attach of the wireless communication device, the support node also sets up a mobility management (MM) function and performs user identification. To transmit and receive information, the packet data protocol (PDP) is activated, whereby the wireless communication device is allocated a packet data address to be used in the packet data connection, wherein the address of the wireless communication device is known in the gateway support node.

Consequently, at the GPRS attach, a data transmission connection is set up to the wireless communication device, to the support node and to the gateway support node, the connection being allocated a protocol (for example X.25 or IP), a connection address (e.g. an X.121 address), the quality of service, and the network service access point identifier (NSAPI). The wireless communication device activates the packet data connection with an activate PDP context request, in which the wireless communication device reports the temporary logical link identity (TLLI), the type of the packet data connection, the address, the requested quality of service, the network service access point identifier, and possibly also the access point name (APN).

The GSM system is a time division multiple access (TDMA) system, in which traffic on the radio channel is time-divided, taking place in successively repeated TDMA frames, each of which consisting of several (eight) time slots. In each time slot, a data packet is transmitted in a radio-frequency burst having a finite duration and consisting of a sequence of modulated bits. The time slots are primarily used as control channels and traffic channels. The traffic channels are used for the transmission of speech and data, and the control channels are used for signalling between the base transceiver station BTS and wireless communication devices MS1.

With an increase in the multimedia properties of wireless communication devices and mobile communication networks, there are more frequently situations in which multimedia messages should be transmitted from a wireless communication device to very different types of target addresses, for example to another wireless communication device or to a multimedia terminal connected to the Internet data network. Thus, in methods and systems of prior art, the problem occurs, how the address data of these different types of target addresses can be transmitted to the message switching centre. Particularly in such transmission, in which the same message is intended to be transmitted to several receivers with different types of terminals, according to prior art the message must be transmitted either separately to different types of receiver addresses or the message switching centre must store information about the address type and address for each receiver. In this latter case, the updating of information causes extra work, and on the other hand the receiver may have several alternatives for receiving multimedia messages, wherein all the different alternatives should be stored in the message switching centre.

The transmission of multimedia messages can be implemented in such a way that the address data is always given in a certain format, e.g. as an MSISDN address or an SMTP address. If only an MSISDN address is in use, messages cannot be transmitted from a wireless terminal to the receiver's terminal connected to the Internet network. However, if only an SMTP address is in use, the message switching centre cannot check whether the wireless terminal of the receiver is connected to the mobile communication network, because information in the home register of the mobile communication network cannot be retrieved in systems of prior art, if only the SMTP address of the receiving terminal is known.

SUMMARY OF THE INVENTION

It is an aim of the present invention to present a flexible addressing system for the transmission of multimedia messages. The invention is based on the idea that upon transmission of the multimedia message, the address data identifying the receiver is supplemented with data on the address type. Thus, on the basis of the type data, the message switching centre processing the message can use the correct address retrieving method to transmit the message to the receiver. The method according to the present invention is characterized in what will be presented in the characterizing part of the appended claim 1. The communication system according to the present system is characterized in what will be presented in the characterizing part of the appended claim 11. The multimedia terminal according to the present invention is characterized in what will be presented in the characterizing part of the appended claim 18. The wireless terminal according to the present invention is characterized in what will be presented in the characterizing part of the appended claim 19.

With the present invention, significant advantages are achieved in comparison with methods and communication systems of prior art. By the method of the invention, multimedia messages can be transmitted in a number of ways from a wireless communication device to a receiver, wherein the receiver does not necessarily need to have a receiving device of a type similar to the transmitting wireless communication device. Thus, the use of the wireless communication device is more versatile, and the user does not transmit messages e.g. with a desktop computer connected to the Internet data network. Furthermore, in the transmission of messages, it is possible to define several receivers in such a way that the message can be transmitted to different receivers also with different types of addresses. Moreover, in the address defining method according to the invention, it is not significant what message transmission protocol is used between the transmitting wireless communication device and the multimedia message switching centre.

In the following, the invention will be described in more detail with reference to the appended drawings, in which

DETAILED DESCRIPTION OF THE INVENTION

In the following, the invention will be described by using as an example a wireless packet network according to the GPRS system, but it is obvious that the invention can also be applied in other communication systems, such as the UMTS mobile communication network. Moreover, the invention is not limited solely to packet networks, but it can also be applied e.g. in circuit-switched connections. The GPRS system is provided with a multimedia messaging service MMS, in which the type of the address of the receiver is examined, and on the basis of this, the message is transmitted to a target complying with this type, as will be presented below in this description. The wireless communication device MS1 used is advantageously a mobile station complying with the GSM system and equipped with multimedia properties in addition to speech functions.

Figure 4:
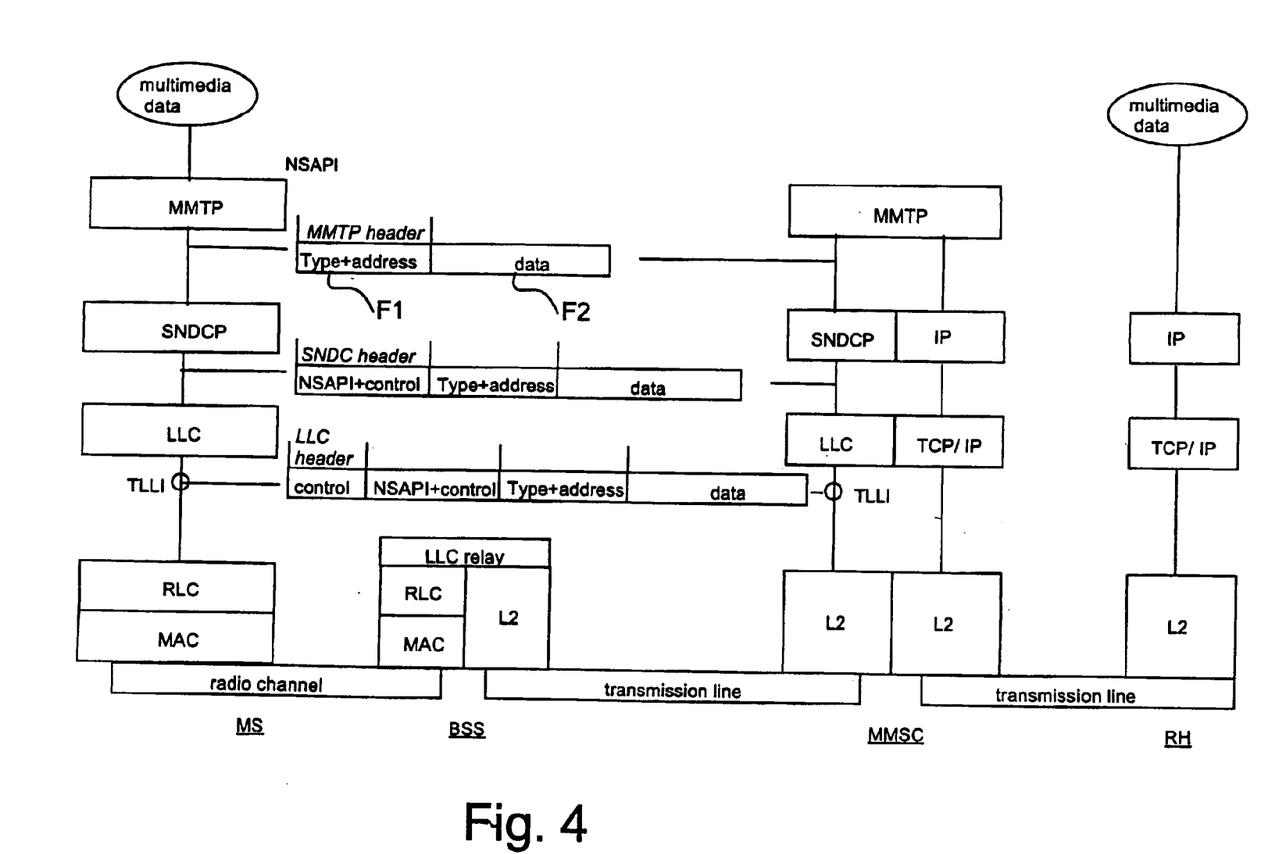
FIG. 4 is a reduced view on the transmission of multimedia messages according to the invention, illustrated in a protocol stack.

The function of the invention will be described with reference to the communication system shown in the appended claim 3 and the protocol stack illustrated in FIG. 4. Of the protocol stack, FIG. 4 shows parts of a wireless communication device MS, a base station subsystem BSS, a multimedia message switching centre MMSC, and the receiving terminal RH connected to the Internet data network.

Figure 3:
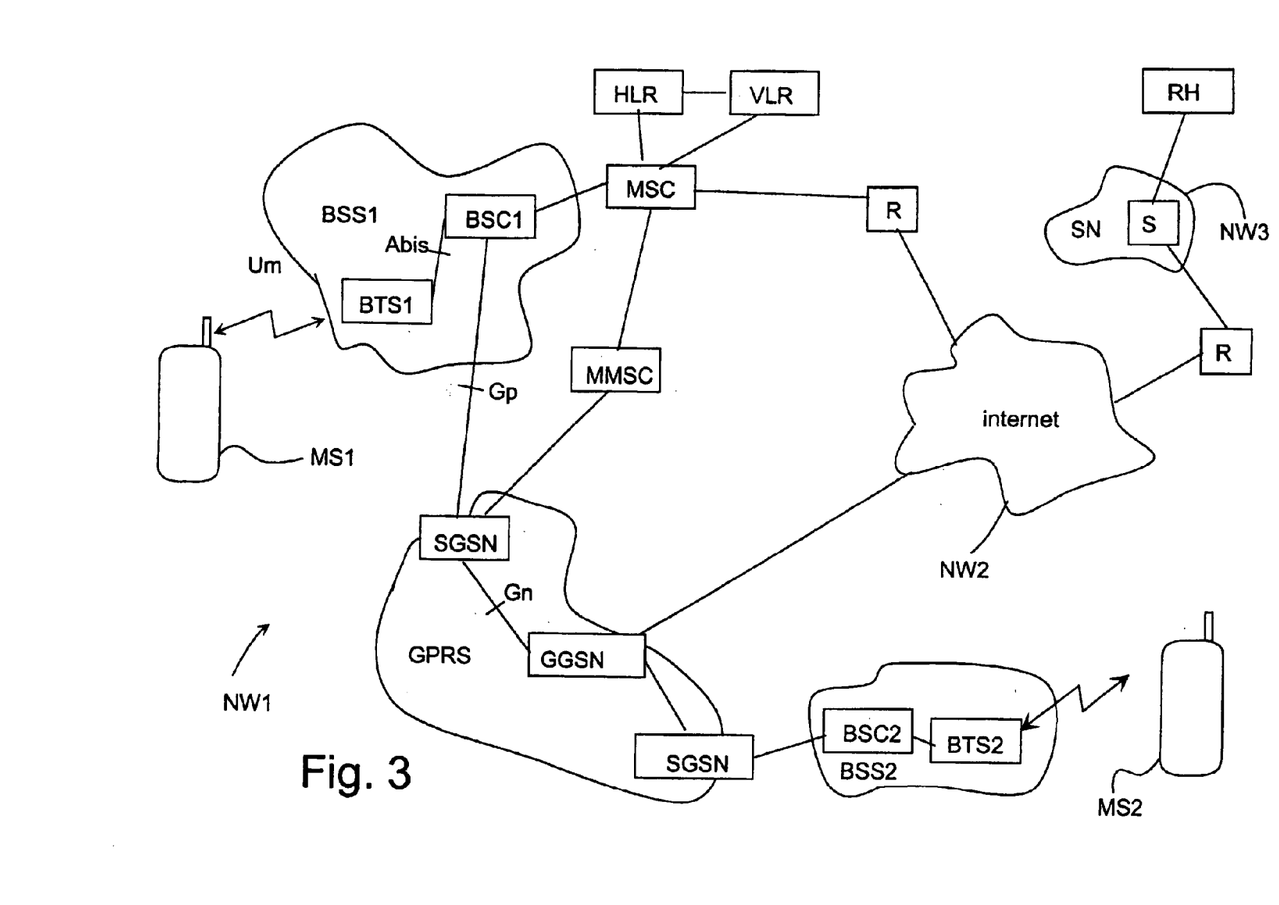
FIG. 3 is a reduced chart showing a communication system in which the invention can be advantageously applied.

The method for transmitting multimedia messages according to an advantageous embodiment of the invention functions in the following way. Let us assume that the user of a wireless communication device MS1 intends to transmit multimedia information to an intended receiver having a terminal device RH, which can be e.g. another wireless cornmunication device, a terminal connected to the Internet data network, or a terminal connected to a local area network NW3. To generate the multimedia message, the user starts an application program provided for this purpose, such as an e-mail program, in the wireless communication device MS1. Such a message function can also be part of another application, such as a so-called Internet browser program (Web browser). The user writes the desired message and selects the attachment files, such as image files, video files, audio files etc. to be transmitted by e-mail. Furthermore, the user defines for one or several receivers the address and/or group of addresses containing e-mail addresses defined in advance. In the system according to a preferred embodiment of the invention, the receiver address data contains not only the actual address but also data on the address type. The address type can be advantageously a telephone number, such as a mobile telephone number MSISDN, an e-mail address, such as a SMTP address (Simple Mail Transfer Protocol), or another identification for the receiving terminal. The address and identification can be given preferably in text format, such as in an ASCII character string, but it is obvious that the address and type data according to the present invention can also be given in other formats that the text format, e.g. in a hexadecimal character string, a binary number, etc. If two or more different formats are available, the message containing the address type and the address is also supplemented with information in the format of address in the message.

In this example, the type data used for a mobile telephone number is the character string "MSISDN", for an SMTP e-mail address is the character string "SMTP", and for an X.400 e-mail address is the character string "X.400", but it is obvious that instead of said character strings also e.g. the numbers 1, 2 and 3 can be used. Moreover, it should be mentioned that within the scope of the invention, the address type can also be different from the MSISDN, SMTP and X.400 types mentioned here.

The address in connection with a multimedia message to be transmitted to a mobile telephone number is e.g. in the format "MSISDN: +358 40 123 4567"; consequently, the type data "MSISDN" comes first and is followed by the actual address data "+358 40 123 4567", which in this example is a mobile telephone number given in the international format.

One format for an e-mail address is the following: "SMTP: firstname. lastname@organization.firm.fi". Consequently, this is an e-mail address according to the SMTP protocol for a person "firstname.lastname" having a terminal defined for the reception of e-mail in the domain "organization.firm.fi".

Another known e-mail system is X.400, wherein, according to the invention, the address is advantageously given in the format "X.400: G=firstname; S=lastname; OU=organization; O=firm; A=elisa; C=fi".

When the same message is transmitted to several receivers, the addresses do not need to be of the same type, but different address types can be used for different receivers. Thus, the address definition can be e.g. in the form "SMTP: firstname.lastname@organization.firm.fi #MSISDN: +358 40 123 4567". In this example, the symbol # is used to separate different address data fields from each other.

After the user has entered the message ready for transmission, the message can be transmitted e.g. by selecting in the application software the transmit command, as is known as such. In the wireless communication device MS, the message to be transmitted is advantageously converted into a message complying with the multimedia messaging service transfer protocol MMTP. A data frame complying with this multimedia messaging service transfer protocol preferably contains at least an address field F1 (MMTP header, FIG. 4) as well as a data field F2. The address type data and the address data are placed in the address field, as presented in the examples above. The actual message is placed in the data field. After this, the wireless communication device MS1 reports to the mobile communication network NW1 that there is a need for message transmission, e.g. by transmitting a request for activating a packet data connection, if the packet data connection is, for any reason, not already activated. When the mobile communication network NW1 has allocated data transmission resources for the wireless communication device MS, the multimedia message is transmitted from the wireless communication device MS1 to the base transceiver station BTS1 in a way known as such so that a protocol of an upper layer in the protocol stack is framed by frames of a lower layer and the actual information is transmitted on the radio channel as messages (packets) complying to the protocol of the physical layer to the base transceiver station BTS1. The base transceiver station BTS1 transmits the message to the base station controller BSC1, which makes the necessary protocol conversions for data transmission between the base station controller BSC1 and the multimedia message switching centre MMSC. In the multimedia message switching centre MMSC, the message is converted from packets of lower layers to one or more packets complying with the multimedia messaging service transfer protocol MMTP, which are stored temporarily, and the receiver data of the message are examined.

Figure 5A:
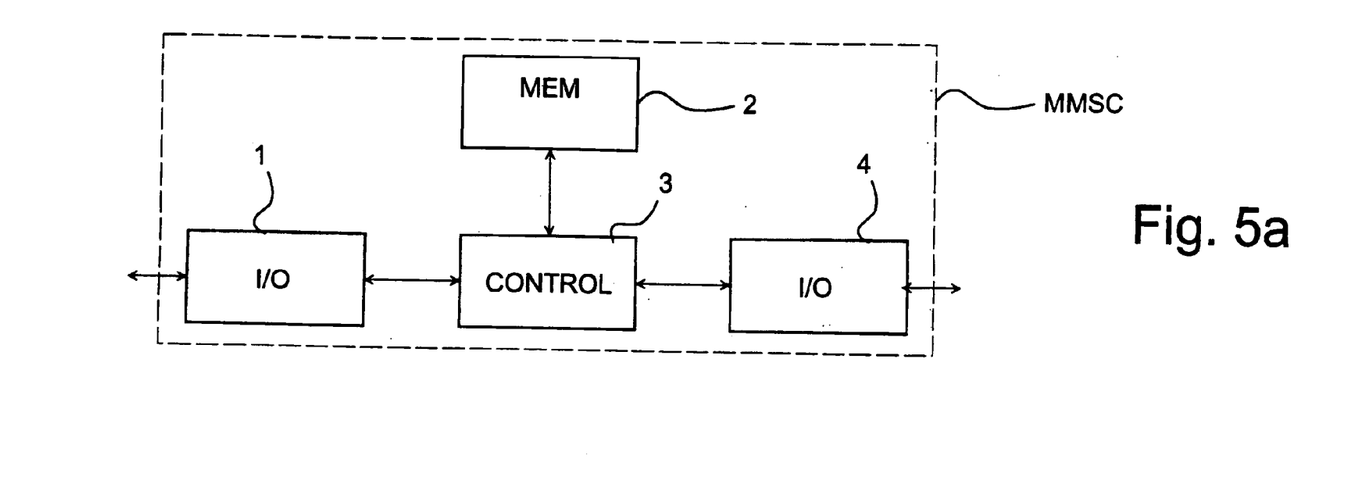
FIG. 5a is a reduced block chart showing a multimedia message switching centre according to an advantageous embodiment of the invention.

The multimedia message switching centre MMSC is implemented e.g. in connection with a GPRS support node SGSN, GGSN, or it can be part of the mobile switching centre MSC. A multimedia message switching centre MMSC according to an advantageous embodiment of the invention is shown in a reduced block chart in the appended FIG. 5a. The block chart shows primarily only the most essential parts with respect to describing the invention. It is obvious that some of the blocks in the multimedia message switching centre MMSC can be shared with the network element SGSN, GGSN, MSC, in which the multimedia message switching centre MMSC is implemented. The multimedia message switching centre MMSC comprises advantageously first communication means 1 for receiving messages in a first communication network NW1, e.g. from a base station subsystem BSS1, storage means 2 for storing received multimedia messages, processing means 3 for processing multimedia messages, as well as second communication means 4 for further transmission of multimedia messages. In a way known as such, the storage means 2 can consists of different types of memories, such as a read only memory, a random access memory, and/or a non-volatile random access memory.

Figure 5B:
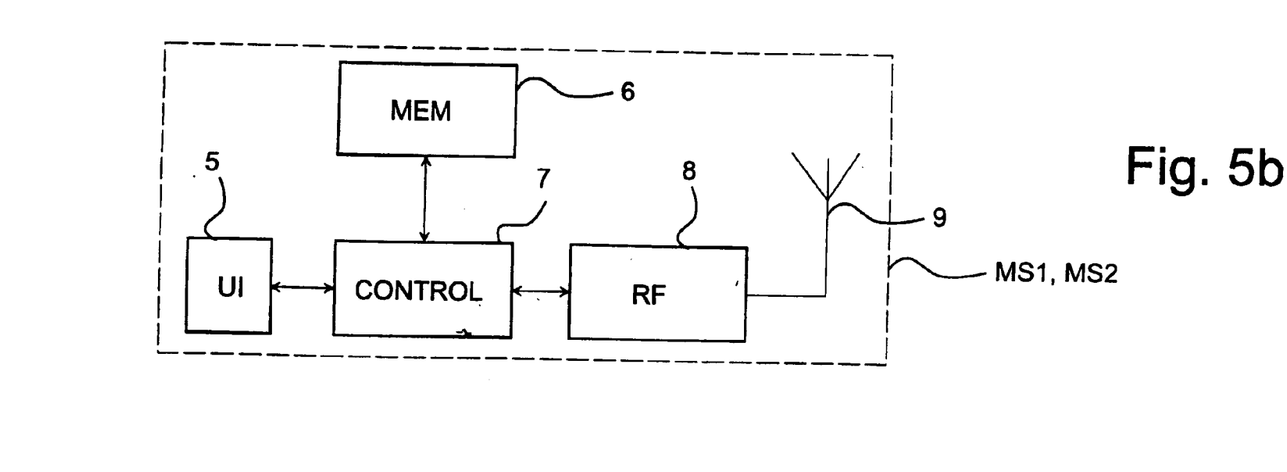
FIG. 5b is a reduced block chart showing a wireless communication device according to a preferred embodiment of the invention.

According to an advantageous embodiment of the invention, the wireless communication device MS1. MS2 is shown in a reduced block chart in the appended FIG. 5b. The block chart primarily shows only the elements which are most essential for describing the invention. The wireless communication device MS1, MS2 comprises preferably a user interface 5 (UI), such as a display, a keypad, a handset, and a microphone (not shown), whereby it is possible to e.g. write messages, select attachment files, and start transmission. Furthermore, FIG. 5b shows storage means 6 for storing e.g. the application software, user settings, and functional parameters of the wireless communication device, control means 7 for controlling the operat ion of the wireless communication device, as well as communication means 8 and an antenna 9 for radio communication between the wireless communication device MS1, MS2 and the base station subsystem BSS1, BSS2. Also, the storage means 6 of the wireless communication device can, in a way known as such, consist of different types of memories, such as a read-only memory, a random access memory, and/or a non-volatile random access memory.

To find out the receivers, the multimedia message switching centre MMSC examines the content of the address field F1 of the message.

The examining takes place preferably in processing means CTRL which consist of a processor or a corresponding data processing means, as is known as such. The examining is started preferably from the address type data, which in this example is located before the address data, at the beginning of the address data field. The multi-media message switching centre MMSC compares the character string expressed by the type data to type data stored in the multimedia message switching centre MMSC, preferably in memory means MEM, to identify the correct type. In the example address "MSISDN: +358 40 123 4567" the type data is separated from the address data with a colon, wherein the part before the colon is used in the comparison. If the type is an MSISDN address, i.e. a mobile telephone number, the transmission of the multimedia message is executed preferably in the following way. On the basis of the mobile tele phone number, the multimedia message switching centre MMSC finds out, if necessary, the mobile communication network NW1 in whose mobile switching centre MSC the home location register HLR of the mobile subscriber in question is registered. If the receiving wireless communication device MS2 is not in the same mobile communication network NW1 as the transmitting wireless communication device MS1, the multimedia message switching centre MMSC requests the mobile switching centre MSC in question to transmit information necessary for the transmission of the message from the home location register HLR to the multimedia message switching centre MMSC. This information preferably contains data on the location of the receiving mobile station, information on whether the receiving mobile station is connected to the mobile communication network, etc.

If the receiving mobile station MS2 is connected to the mobile communication network, e.g. the second base station subsystem BSS2 of the mobile communication network NW1 in FIG. 3, the multimedia message switching centre MMSC transmits the message to this base station subsystem BSS2, from which the message is transmitted further to the receiving mobile station MS2. The message is transmitted preferably via the GPRS packet network, if the receiving mobile station is a GSM mobile station. If the receiving mobile station MS2 is in a different mobile communication network than the transmitting mobile station MS2, the message is transmitted between these mobile communication networks in a way known as such. For example, in a situation in which the transmitting mobile station MS1 is a GSM mobile station and the receiving mobile station MS2 is a UMTS mobile station, the message is transmitted from the GPRS packet network to the UMTS mobile communication network, in which the message is transmitted further to the receiving mobile station MS2.

If the receiving mobile station MS2 is not connected to the mobile cornmunication network at that moment, the multimedia message switching centre MMSC can try to retransmit the message later on. A maximum number can be set for these retransmission attempts to avoid unnecessary overloading of communication networks used for transmission of messages.

If the type is an SMTP address, the transmission of the multimedia message is preferably executed in the following way. First, the multimedia message switching centre MMSC finds out the domain data in the address, in this example "organization.firm.fi". After this, the multimedia message switching centre MMSC makes a name service request to a domain name server DNS connected to the Internet data network, to find out the IP address of the e-mail server of the receiver. The domain name server contains stored IP addresses corresponding to the above-identified name format, i.e. so-called dot notation number sequences (e.g. 123.456.789.321). If necessary, the domain name server DNS routs the request to another name server (not shown), if the required information is not found in the domain name server DNS in question. In this routing, definitions in the name are utilized, such as the identification separated with a dot at the end. This identification can be a country code (in the example, fi), "org", "corn", "edu", etc. The result of the inquiry is returned to the domain name server DNS which returns the information to the multimedia message switching centre MMSC.

After this, if the IP address of the e-mail server was found, the multimedia message switching centre MMSC executes the necessary protocol conversions to transmit the message to the e-mail server of the receiver in a way known as such using an Internet e-mail transmission protocol, such as the SMTP. FIG. 4 illustrates with a protocol stack also the transmission of a message from the multimedia message switching centre MMSC to a receiving terminal RH. FIG. 4 shows only an end-to-end connection, but in practice, the transmission of the message is often executed via one or more routers R to a server S acting as the e-mail server of the receiver. In the example of FIG. 3, the receiving terminal is connected to a local area network NW3.

The local area network is in a data transmission connection e.g. to the Internet data network or to another data network via the server S. The server S controls the operation of the local area network NW3, as is known as such. The e-mail server and the server S controlling the operation of the local area network can also be different data processing devices. Moreover, also more than one server S and one terminal RH can be connected to the same local area network NW3.

After the multimedia message has arrived at the e-mail server of the receiver, where it is stored, the e-mail server examines e.g. from log-in data stored in the server S whether the terminal RH of the receiver is accessed in the local area network NW3. If the terminal RH of the receiver is connected to the local area network NW3, the e-mail server transmits information on the received e-mail to the terminal RH. After this, the receiver can start an e-mail handling program in the terminal RH to open the received message in a way known as such.

The receiver data may also comprise more than one receiver. Because preferably all the addresses are annexed to the address field F1 already at the transmission stage, it is sufficient to transmit the message only once from the wireless communication device MS1 to the multimedia message switching centre MMSC. The multimedia message switching centre MMSC takes care of the transmission of the message to the different receivers. Thus, the multimedia message switching centre MMSC examines from a multimedia message transfer protocol message MMSTP the type data of each address transmitted in the address field F1 as well as the address data according to the type, as already presented above in this description. The transmission of the message to each receiver is executed according to the type of the address.

Naturally, the wireless communication device MS1 used in the transmission of messages in the examples presented above can also be used for receiving messages, wherein the address of this wireless communication device MS1 is indicated by the transmitter as the address and the address type preferably MSISDN.

The transmission costs caused by the transmission of messages can be collected from the transmitter of the message. The costs are affected e.g. by the type of the network NW1, NW2, NW3 to which the message is transmitted, the time of day, the number of receivers, etc.

It is obvious that the present invention is not limited solely to the embodiments presented above, but it can be modified within the scope of the appended claims.

What is claimed is:

1. A method for the transmission of multimedia messages in a communication system from a transmitting terminal (MS1) to a receiving terminal (RH, MS2), which communication system comprises at least a first communication network (NW1), a second communication network (NW2) and a multimedia message switching centre (MMSC), in which first communication network (NW1) at least a first address type is used as the terminal address and in which second communication network (NW2) at least a second address type is used as the terminal address, and in which system the address of the receiving terminal (RH, MS2) is annexed to said multimedia message, characterized in that the multimedia message is further supplemented with data on the type of said address, wherein the multimedia message is transmitted from the transmitting terminal (MS1) to said multimedia message switching centre (MMSC), in which the type of the address of the receiving terminal (RH, MS2), is examined, and said address type is used to select the communication network (NW1, NW2) to be used in the transmission of the message from the multimedia message switching centre (MMSC) to the receiving terminal (RH, MS2).

2. The method according to claim 1, characterized in that the first communication network (NW1) used is a mobile communication network and the second communication network (NW2) used is the Inter-net data network.

3. The method according to claim 2, characterized in that the first address type is an MSISDN number and the second address type is an SMTP address.

4. The method according to claim 2, characterized in that in the first communication network (NW1), multimedia messages are transmitted by using a first communication protocol, and in the second communication network (NW2), multimedia messages are transmitted by using a second communication protocol, and that the format of the data on the type of the address to be annexed to the multimedia message is independent of said communication protocols for multimedia messages.

5. The method according to claim 1, characterized in that the multimedia message is transmitted to two or more receivers, wherein the message is supplemented with the address of the terminal (RH, MS2) of each receiver, as well as data on the type of each address.

6. The method according to claim 1, characterized in that the communication system is provided with a multimedia messaging service transfer protocol (MMTP), wherein multimedia messages to be transmitted from the transmitting terminal (MS1) to the multimedia message switching centre (MMSC) are converted into messages complying with said multimedia messaging service transfer protocol (MMTP).

7. The method according to claim 1, characterized in that said data on the address type is given in text format.

8. The method according to claim 1, characterized in that said data on the address type is given as a hexadecimal character string.

9. The method according to claim 1, characterized in that said data on the address type is given as a binary number.

10. The method according to claim 1, characterized in that in the method, two or more formats are used in the address and the address type data of said receiving terminal (RH, MS2), wherein in the method the multimedia message is also supplemented with data on the format used in the address and the address type data.

11. A communication system comprising means for transmitting multimedia messages from a transmitting terminal (MS1) to a receiving terminal (RH, MS2), at least a first communication network (NW1), a second communication network (NW2) and a multimedia message switching centre (MMSC), in which first communication network (NW1) at least a first address type is used as the address of the terminal, in which second communication network (NW2) at least a second address type is used as the address of the terminal, and said multimedia message is supplemented with the address of the receiving terminal (RH, MS2) characterized in that the communication system also comprises means (6, 7) for annexing data on the type of said address to the multimedia message, wherein the multimedia message is arranged to be transmitted from the transmitting terminal (MS1) to said multimedia message switching centre (MMSC) which comprises means (2, 3) for examining the data on the type of the address of the receiving terminal (RH, MS2) and means (3, 4) for using said address type to select the communication network (NW1, NW2) to be used in the transmission of the message from the multimedia message switching centre (MMSC) to the receiving terminal (RH, MS2).

12. The communication system according to claim 11, characterized in that the first communication network (NW1) is a mobile communication network and the second communication network (NW2) is the Internet data network.

13. The communication system according to claim 12, characterized in that the first address type is an MSISDN number and the second address type is an SMTP address.

14. The communication system according to claim 12, characterized in that the first communication network (NW1) is provided with a first communication protocol and the second communication network (NW2) is provided with a second communication protocol for the transmission of multimedia messages, and that the format of the address type data to be annexed to the multimedia message is independent of said communication protocols for multimedia messages.

15. The communication system according to claim 11, characterized in that the multimedia message to be transmitted to two or more receivers is supplemented: with the address of the terminal (RH, MS2) of each receiver as well as data on the type of each address.

16. The communication system according to claim 11, characterized in that the communication system is provided with a multimedia messaging service transfer protocol (MMTP), wherein the transmitting terminal (MS1) comprises means for converting multimedia messages which will be transmitted to the multimedia message switching centre (MMSC) to messages complying with said multimedia messaging service transfer protocol (MMTP).

17. The communication system according to claim 11, characterized in that at least one of said terminals (MS1, MS2, RH) is a wireless communication terminal (MS1, MS2).

18. A multimedia message switching centre (MMSC) arranged to be used in a communication system which comprises means for transmitting multimedia messages from a transmitting terminal (MS1) to a receiving terminal (RH, MS2), at least a first communication network (NW1), and a second communication network (NW2), in which first communication network (NW1) the address used for the terminal is of at least a first address type, and in which second communication network (NW2) the address used for the terminal is of at least a second address type, and said multimedia message is supplemented with the address of the receiving terminal (RH, MS2), characterized in that the multimedia message switching centre (MMSC) comprises means (1) for receiving the multimedia message, which multimedia message is also supplemented in the terminal (MS1) transmitting the multimedia message with at least one type of the address of at least one of a plurality of receiving terminals including said receiving terminal (RH, MS2), wherein the multimedia message switching centre (MMSC) also comprises means (2, 3) for examining said address type data from the multimedia message, and means (3, 4) for using said address type to select the communication network (NW1, NW2) to be used in the transmission of the message from the multimedia message switching centre (MMSC) to the receiving terminal (RH, MS2).

19. A wireless terminal (MS1) arranged to be used in a communication system comprising means (BSS1, BSS2) for transmission of multimedia messages from a transmitting terminal (MS1) to a receiving terminal (RH, MS2), at least a first communication network (NW1), a second communication network (NW2), and a multimedia message switching centre (MMSC), in which first communication network (NW1) the address used for the terminal is of at least a first address type, and in which second communication network (NW2) the address used for the terminal is of at least a second address type, and which wireless terminal (MS1) comprises means for annexing the address of the receiving terminal (RH, MS2) in said multimedia message, characterized in that the wireless terminal (MS1) also comprises means (6, 7) for supplementing data on the type of the address of said receiving terminal (RH, MS2).

20. A method for the transmission of multimedia messages in a communication system from a transmitting terminal (MS1) to a receiving terminal (RH, MS2), which communication system comprises at least a first communication network (NW1), a second communication network (NW2) and a multimedia message switching centre (MMSC); in which first communication network (NW1) at least a first address type is used as the terminal address and in which second communication network (NW2) at least a second address type is used as the terminal address, and in which system the address of a receiving terminal (RH, MS2) is annexed to a multimedia message, wherein the method includes the steps of: supplementing the multimedia message with data setting forth the type of said address, transmitting the multimedia message from the transmitting terminal (MS1) to said multimedia message switching centre (MMSC), examining the type of the address of the receiving terminal (RH, MS2), and selecting the communication network (NW1, NW2) to be used in the transmission of the message from the multimedia message switching centre (MMSC) to the receiving terminal (RH, MS2), wherein said selecting step is accomplished is based on said address type.

* * * * *